(No Model.)
J. F. DOEBLER.
BAKING PAN.
No. 346,808. Patented Aug. 3, 1886.
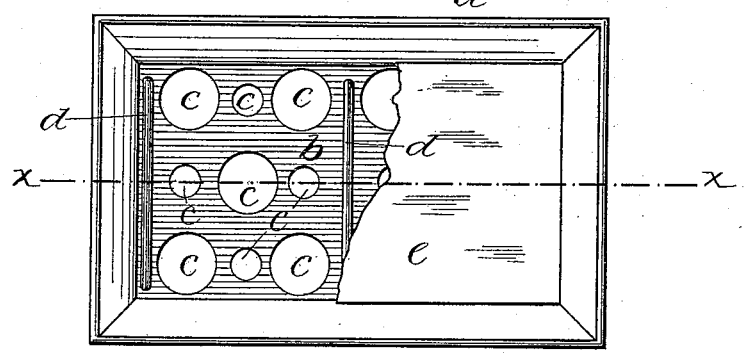
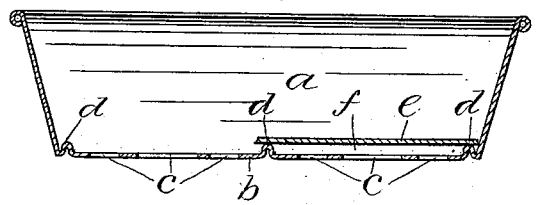
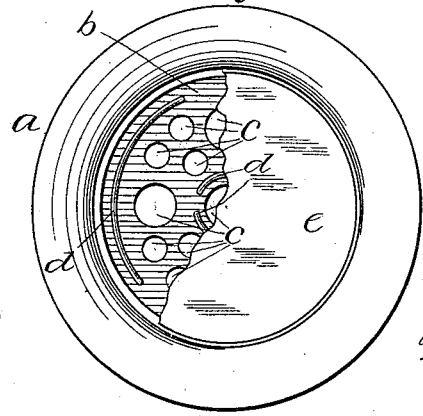
Witnesses:
H. R. Williams.
W. M. Bjoerkman.
Inventor.
John F. Doebler,
By Simonds & Burdett
Attys.

UNITED STATES PATENT OFFICE.

JOHN F. DOEBLER, OF ROCKVILLE, CONNECTICUT.

BAKING-PAN.

SPECIFICATION forming part of Letters Patent No. 346,808, dated August 3, 1886.

Application filed August 25, 1884. Serial No. 141,387. (No model.)

*To all whom it may concern:*

Be it known that I, JOHN F. DOEBLER, of Rockville, in the county of Tolland and State of Connecticut, have invented certain new and useful Improvements in Baking Utensils; and I do hereby declare that the following is a full, clear, and exact description thereof, whereby a person skilled in the art can make and use the same, reference being had to the accompanying drawings, and to the letters of reference marked thereon, where—

Figure 1 is a plan view of a baking-pan, looking into the pan and showing a portion of the false bottom removed. Fig. 2 is a view in vertical section of the pan on plane denoted by line $x\ x$ of Fig. 1. Fig. 3 is a detail view in section, on same plane, showing alternate means for supporting the false bottom. Fig. 4 is a detail plan view of a pie-plate with part of the false bottom broken away.

In the use of the ordinary utensil for baking bread, cake, pie, or the like a great difficulty has been experienced by the housewife, and annoyance caused by the dough adhering to the bottom of the baking pan; and the object of my invention is to remedy this difficulty.

My invention consists in providing a baking utensil, the bottom of which is perforated with a removable false bottom designed to support the material, as dough, that is to be baked in the utensil.

In the accompanying drawings, the letter $a$ denotes a pan, which may be of metal or other suitable material; $b$, the bottom of the pan; $c$, openings or perforations in the bottom of the pan; $d$, ribs or projections on the bottom $b$, that serve to support the false bottom $e$ in such manner that the space $f$ is left between the true and false bottom of the pan. This space $f$ between the two bottoms is a material feature of my invention, and it may be obtained by means of the ribs or projections on either of the bottoms, or by suspending the false bottom from the sides, as by means of cross wires or hooks; but the device shown is preferable.

In order to use my invention, a pan, made substantially as described, and having the false bottom in place, is filled to the usual extent with material to be baked, as dough, and is then placed in an oven and kept there till the contents are baked. The heated air enters the space between the bottoms and heats the false bottom in a manner that aids in the baking. After the pan is taken from the oven the contents are freed from the sides by running a knife around it, and then removed by turning the pan upside down, the false bottom adhering in most instances to the bottom of the material baked. By running a thin-bladed knife under it this false bottom can easily be cut away without the least waste or damage.

A pan having a solid imperforate bottom with an elevated removable false bottom is old; but the objection to that construction is that there is not a free circulation of heated air beneath the false bottom.

A pan having no fixed bottom, but provided with a removable bottom, is also old, and an objection to that construction is that the pan is frail. Moreover, it is sometimes desirable to rest the pan itself upon a support above the bottom of the oven or top of the stove, for example, as is commonly practiced upon a brick or sad-iron rest or similar object having its top of less area than the bottom of the pan, and this could not be practicable with a pan of this latter construction.

I claim as my invention—

1. The combination, with a baking utensil having a fixed perforated or foraminous bottom, of a removable imperforate bottom, consisting of a sheet of plane unbent metal fitting and located in said pan above the fixed perforated bottom, substantially as and for the purpose described.

2. The combination, with a baking utensil having a fixed perforated bottom, of a removable imperforate bottom consisting of a sheet of plane unbent metal fitting and located in said pan, and supports for maintaining said imperforate bottom in a position above the fixed perforate bottom, substantially as described, whereby a space is left between them, for the purpose set forth.

3. In a baking utensil, the combination of the pan $a$, having the fixed perforated or foraminous bottom $b$ and supports $d$, a removable imperforate bottom, $e$, consisting of a sheet of plane unbent metal fitting and located upon said supports, substantially as shown and described.

JOHN F. DOEBLER.

Witnesses:
  GELON W. WEST,
  HERBERT S. PULLMAN.